(12) United States Patent
Manda

(10) Patent No.: US 9,979,859 B2
(45) Date of Patent: May 22, 2018

(54) IMAGE FORMING APPARATUS THAT ENSURES IMPROVED VISIBILITY OF LOW LIGHTNESS PART, AND COLOR CONVERSION METHOD, AND RECORDING MEDIUM

(71) Applicant: KYOCERA Document Solutions Inc., Osaka (JP)

(72) Inventor: Etsuko Manda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 4 days.

(21) Appl. No.: 15/264,451

(22) Filed: Sep. 13, 2016

(65) Prior Publication Data
US 2017/0094124 A1    Mar. 30, 2017

(30) Foreign Application Priority Data

Sep. 25, 2015  (JP) ................. 2015-188068

(51) Int. Cl.
| H04N 1/60 | (2006.01) |
| H04N 1/23 | (2006.01) |
| H04N 1/62 | (2006.01) |
| H04N 1/46 | (2006.01) |

(52) U.S. Cl.
CPC ......... *H04N 1/6019* (2013.01); *H04N 1/6008* (2013.01); *H04N 1/6027* (2013.01); *H04N 1/6075* (2013.01); *H04N 2201/0094* (2013.01)

(58) Field of Classification Search
None
See application file for complete search history.

(56) References Cited

U.S. PATENT DOCUMENTS

| 5,734,368 | A   * | 3/1998  | Meyers | H04N 1/644 |
|           |       |         |        | 345/593 |
| 6,125,201 | A   * | 9/2000  | Zador  | H04N 19/63 |
|           |       |         |        | 375/E7.048 |
| 9,160,890 | B2  * | 10/2015 | Manda  | H04N 1/6002 |
| 9,635,217 | B2  * | 4/2017  | Manda  | H04N 1/6016 |
| 2002/0051147 | A1 * | 5/2002 | Asai | H04N 1/4055 |
|           |       |         |        | 358/1.9 |
| 2004/0032600 | A1 * | 2/2004 | Burns | H04N 1/4055 |
|           |       |         |        | 358/1.9 |

(Continued)

FOREIGN PATENT DOCUMENTS

JP    2014-63268 A    4/2014

*Primary Examiner* — Madelein Nguyen
(74) *Attorney, Agent, or Firm* — Stein IP, LLC

(57) ABSTRACT

An image forming apparatus includes a color conversion unit, a representative-hue-range acquiring unit, and a color correction unit. In a Voronoi diagram based on a grid point of the color conversion table with respect to one hue range of the two representative hue ranges obtained by the representative-hue-range acquiring unit, when a movement pixel corresponds most to a Voronoi region where the pixels inside the one hue range in the specific part corresponds most, the movement pixel being a pixel inside the other hue range of the two representative hue ranges in the specific part with only the hue of the pixel being moved to the one hue range, the color correction unit corrects color of the image inside the other hue range in the specific part such that the movement pixel does not correspond to the Voronoi region.

4 Claims, 12 Drawing Sheets

(56) References Cited

U.S. PATENT DOCUMENTS

| | | | | |
|---|---|---|---|---|
| 2010/0020107 | A1* | 1/2010 | Chui | G09G 3/005 345/690 |
| 2010/0097622 | A1* | 4/2010 | Qiao | H04N 1/6058 358/1.9 |
| 2010/0157330 | A1* | 6/2010 | Qiao | H04N 1/603 358/1.9 |
| 2010/0157372 | A1* | 6/2010 | Qiao | H04N 1/6022 358/3.01 |
| 2010/0157393 | A1* | 6/2010 | Qiao | H04N 1/6022 358/500 |
| 2010/0157397 | A1* | 6/2010 | Qiao | H04N 1/6022 358/518 |
| 2010/0158359 | A1* | 6/2010 | Qiao | G06K 9/4652 382/164 |
| 2010/0165364 | A1* | 7/2010 | Qiao | H04N 1/603 358/1.9 |
| 2010/0302404 | A1* | 12/2010 | Mizukura | H04N 1/6058 348/222.1 |
| 2011/0181597 | A1* | 7/2011 | Cardno | G06Q 40/04 345/440 |
| 2011/0288854 | A1* | 11/2011 | Glass | G06F 3/0482 704/9 |
| 2012/0039529 | A1* | 2/2012 | Rujan | G06K 7/1417 382/164 |
| 2012/0050370 | A1* | 3/2012 | Iritani | B41J 2/2114 347/15 |
| 2012/0127279 | A1* | 5/2012 | Kochi | G01B 11/24 348/50 |
| 2012/0207487 | A1* | 8/2012 | Stelter | G03G 15/0877 399/27 |
| 2012/0207488 | A1* | 8/2012 | Stelter | G03G 15/0844 399/27 |
| 2012/0207489 | A1* | 8/2012 | Stelter | G03G 15/0856 399/27 |
| 2014/0153056 | A1* | 6/2014 | Takagi | G06F 15/025 358/3.09 |
| 2014/0160214 | A1* | 6/2014 | Conesa | B41M 5/0017 347/101 |
| 2015/0116739 | A1* | 4/2015 | Manda | H04N 1/6002 358/1.9 |
| 2015/0116780 | A1* | 4/2015 | Manda | H04N 1/405 358/3.06 |
| 2015/0242701 | A1 | 8/2015 | Tokui et al. | |
| 2016/0187199 | A1* | 6/2016 | Brunk | G01J 3/2823 348/89 |
| 2017/0094098 | A1* | 3/2017 | Manda | H04N 1/2338 |

* cited by examiner though the description pro-
vided in this summary section and elsewhere in this docu-
ment is intended to illustrate the claimed subject matter by
way of example and not by way of limitation.

IMAGE FORMING APPARATUS THAT ENSURES IMPROVED VISIBILITY OF LOW LIGHTNESS PART, AND COLOR CONVERSION METHOD, AND RECORDING MEDIUM

INCORPORATION BY REFERENCE

This application is based upon, and claims the benefit of priority from, corresponding Japanese Patent Application No. 2015-188068 filed in the Japan Patent Office on Sep. 25, 2015, the entire contents of which are incorporated herein by reference.

BACKGROUND

Unless otherwise indicated herein, the description in this section is not prior art to the claims in this application and is not admitted to be prior art by inclusion in this section.

There is a typical image forming apparatus that converts colors of images for a print job. The typical image forming apparatus obtains correction coefficient for each specific region based on lightness of the specific region in an image, and then changes the lightness of the specific region with the obtained correction coefficient when printing an image where characters and objects with dark colors such as black and dark blue are present in a dark background such as a background at nighttime. The typical image forming appa-
ratus improves a lightness difference of a low lightness part in an image to distinguish characters and objects from a background, thus ensuring visibility.

SUMMARY

An image forming apparatus according to one aspect of the disclosure includes a color conversion unit, a represen-
tative-hue-range acquiring unit, and a color correction unit. The color conversion unit converts a color of an image by a color conversion table for a print job. The representative-
hue-range acquiring unit obtains two representative hue ranges relative to a specific part of the image among a plurality of hue ranges where whole color gamut is divided. The color correction unit corrects the color of the image whose color is converted by the color conversion unit. The representative-hue-range acquiring unit obtains a hue-range pixel number for each of the hue ranges, the hue-range pixel number being a count of pixels included in the hue range among the pixels in the specific part, and obtains the top two hue ranges that have largest hue-range pixel numbers among the hue ranges that have large hue-range pixel numbers compared with the adjacent hue ranges as each of the representative hue ranges. In a Voronoi diagram based on a grid point of the color conversion table with respect to one hue range of the two representative hue ranges obtained by the representative-hue-range acquiring unit, when a move-
ment pixel corresponds most to a Voronoi region where the pixels inside the one hue range in the specific part corre-
sponds most, the movement pixel being a pixel inside the other hue range of the two representative hue ranges in the specific part with only the hue of the pixel being moved to the one hue range, the color correction unit corrects color of the image inside the other hue range in the specific part such that the movement pixel does not correspond to the Voronoi region.

These as well as other aspects, advantages, and alterna-
tives will become apparent to those of ordinary skill in the art by reading the following detailed description with ref-
erence where appropriate to the accompanying drawings. Further, it should be understood that the description pro-
vided in this summary section and elsewhere in this docu-
ment is intended to illustrate the claimed subject matter by way of example and not by way of limitation.

DETAILED DESCRIPTION

Figure 1:
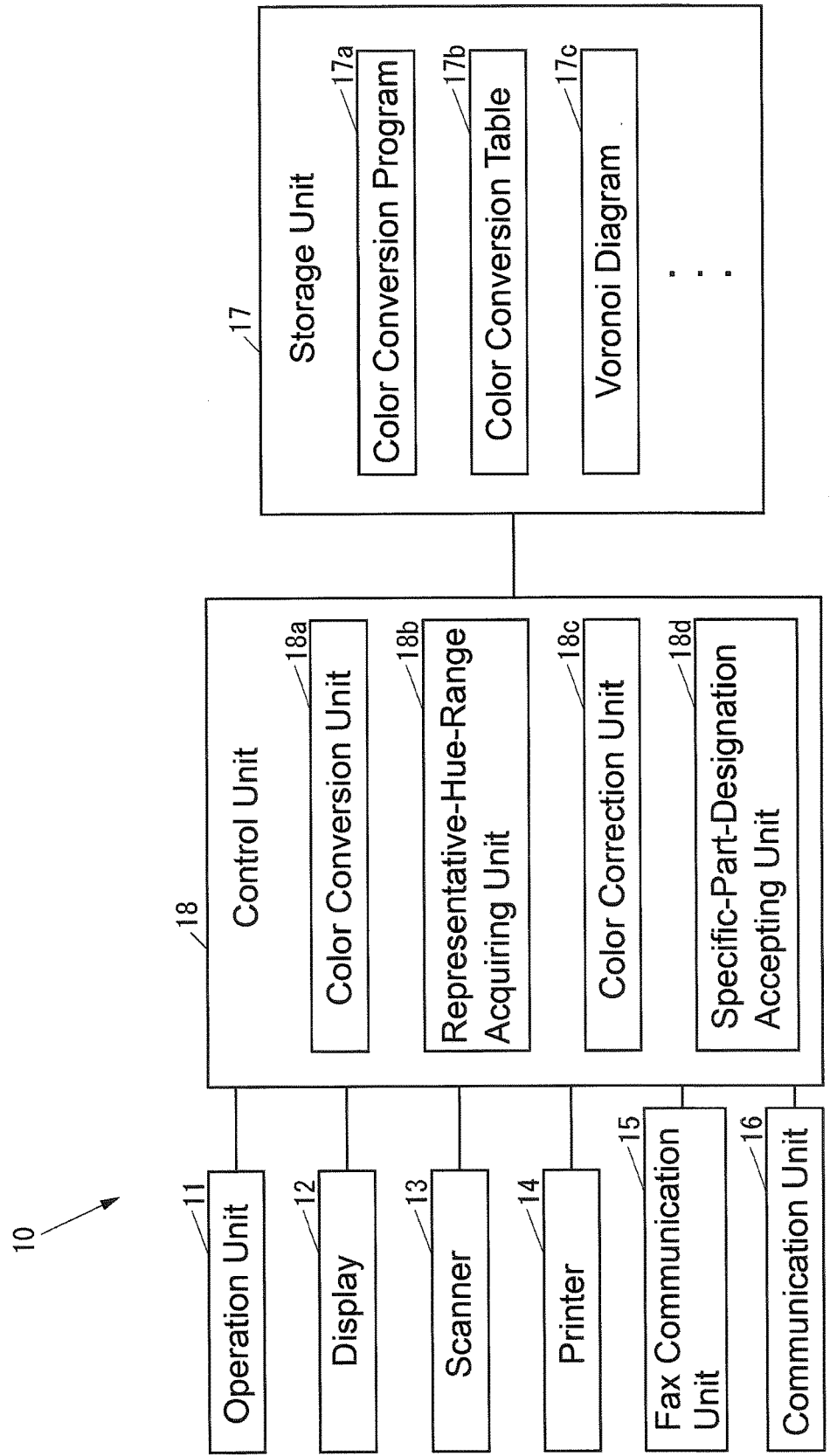
FIG. 1 illustrates an MFP according to one embodiment of the disclosure.

Example apparatuses are described herein. Other example embodiments or features may further be utilized, and other changes may be made, without departing from the spirit or scope of the subject matter presented herein. In the follow-
ing detailed description, reference is made to the accompa-
nying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contem-
plated herein.

The following describes one embodiment of the disclo-
sure with reference to the accompanying drawings.

First, a description will be given of a configuration of a Multifunction Peripheral (MFP) as an image forming appa-
ratus according to the embodiment.

FIG. 1 illustrates an MFP 10 according to the embodi-
ment.

As illustrated in FIG. 1, the MFP 10 includes an operation unit 11, a display 12, a scanner 13, a printer 14, a fax communication unit 15, a communication unit 16, a storage unit 17, and a control unit 18 that controls the whole MFP 10. The operation unit 11 is an input device such as a button for entering various kinds of operations. The display 12 is a display device such as a Liquid Crystal Display (LCD) displaying various kinds of information. The scanner 13 is a reading device reading images. The printer 14 is a print device executing a print job on a recording medium such as a paper sheet. The fax communication unit 15 is a fax device performing fax communication with external facsimile device (not illustrated) via a communication line such as a dial-up line. The communication unit 16 is a communication device communicating with external devices via a network such as a Local Area Network (LAN) or the Internet. The storage unit 17 is a storage device such as a semiconductor memory or a Hard Disk Drive (HDD) storing various kinds of data.

The storage unit 17 stores a color conversion program 17a for converting colors of an image for a print job. The color conversion program 17a may be installed into the MFP 10 at production stage of the MFP 10, or may be additionally installed into the MFP 10 from an outside storage medium such as a Universal Serial Bus (USB) memory, or may be additionally installed into the MFP 10 from a network.

The storage unit 17 stores a color conversion table 17b. The color conversion table 17b includes a lookup table of "RGB|Lab (Lch)|CMYK." That is, the color conversion table 17b is a color table that indicate respective correspondence relationships of an RGB value, a Lab value (Lch value), and a CMYK value. The RGB value, the Lab value (Lch value), and the CMYK value included in the color conversion table 17b are design values.

The storage unit 17 stores a plurality of Voronoi diagrams 17c based on the Lab value (Lch value) at grid points of the color conversion table 17b.

Figure 2:
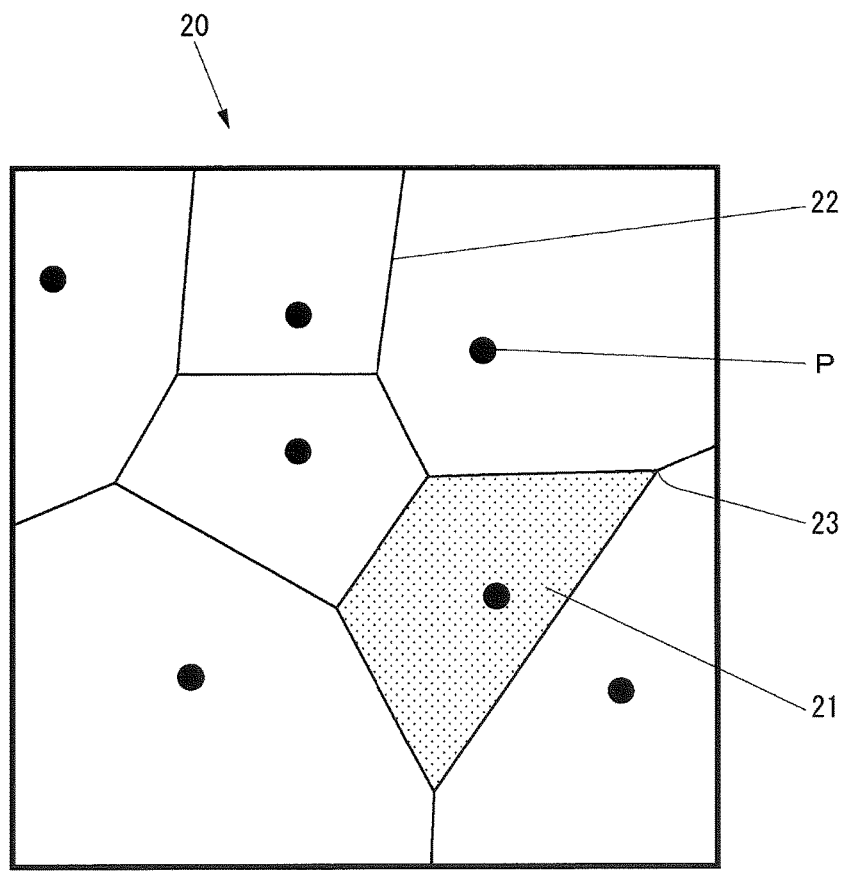
FIG. 2 illustrates an exemplary Voronoi diagram gener-
ated by the MFP according to the one embodiment.

Here, the Voronoi diagram is, as illustrated in FIG. 2, a diagram that separates a space that is closest from each point among the points present in the space, with a hyperplane such as a line or a surface. A Voronoi diagram 20 illustrated in FIG. 2 represents a case where the space is two-dimensional. When the space is three-dimensional as an RGB space, the Voronoi diagram becomes a diagram where the Voronoi diagram 20 is extended to three dimensions. The Voronoi diagram is defined as a set of Voronoi regions {V (p$_1$), V (p$_2$), . . . , V (p$_n$)} with respect to a finite set P={p$_1$, p$_2$, . . . , p$_n$} inside a metric space. The Voronoi region means a region V (p$_i$) constituted of the following Formula 1 with respect to a distance function d.

$$V(p_i)=\{p|d(p,p_i) \le d(p,p_j), i \ne j\}$$ [Formula 1]

As illustrated in FIG. 2, the Voronoi diagram 20 includes a plurality of Voronoi regions 21. The Voronoi diagram 20 is a diagram that separates the closest space from each generatrix p, which is present in the space, with a line. One Voronoi region 21 includes only one generatrix p. The boundary of the Voronoi region 21 is referred to as a Voronoi side 22. Each Intersection point of the Voronoi sides 22 is referred to as a Voronoi seed 23.

Figure 3:
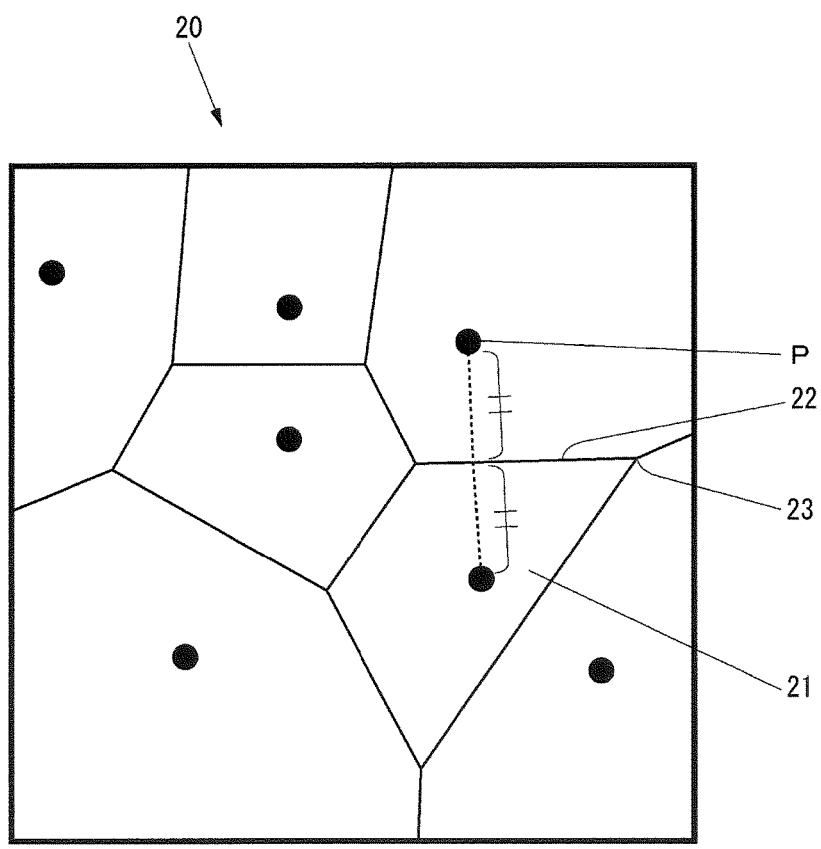
FIG. 3 illustrates one of features of the Voronoi diagram illustrated in FIG. 2.
Figure 4:
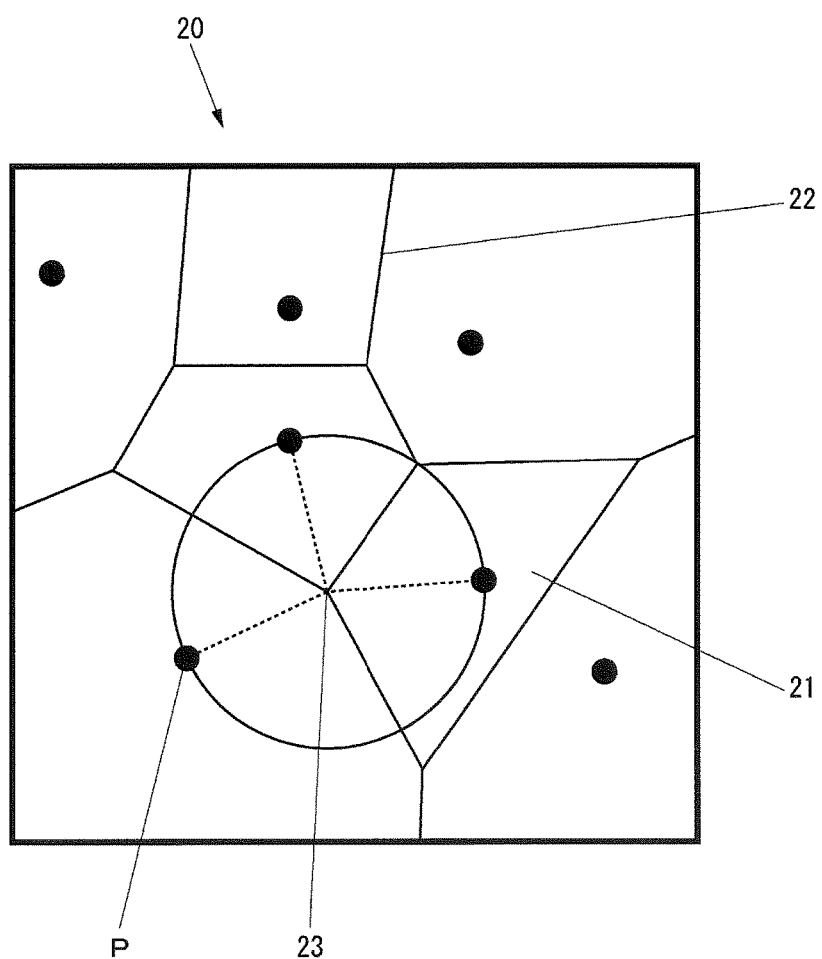
FIG. 4 illustrates one of the features other than the features illustrated in FIG. 3, of the Voronoi diagram illus-
trated in FIG. 2.

The Voronoi diagram 20, as illustrated in FIG. 3, has a feature that a perpendicular bisector of two generatrices p, which are adjacent to one another, is the Voronoi side 22. The Voronoi diagram 20, as illustrated in FIG. 4, has a feature that a center of a circle passing through three generatrices p, which are adjacent to one another, is the Voronoi seed 23.

The control unit 18 includes, for example, a Central Processing Unit (CPU), a Read Only Memory (ROM) storing programs and various kinds of data, a Random Access Memory (RAM) used as a work area of the CPU. The CPU executes the programs stored in the ROM or the storage unit 17.

The control unit 18, by executing the color conversion program 17a stored in the storage unit 17, functions as the following: a color conversion unit 18a that converts a color of an image for a print job with the color conversion table 17b; a representative-hue-range acquiring unit 18b that obtains two representative hue ranges relative to a specific part of the image among 48 hue ranges to which a whole color gamut is divided; a color correction unit 18c that corrects the color of the image, the color of which is converted by the color conversion unit 18a; and a specific-part-designation accepting unit 18d that accepts a designation of the specific part of the image.

Next, a description will be given of operations of the MFP 10.

First, a description will be given of the operations of the MFP 10 when generating a Voronoi diagram.

Figure 5:
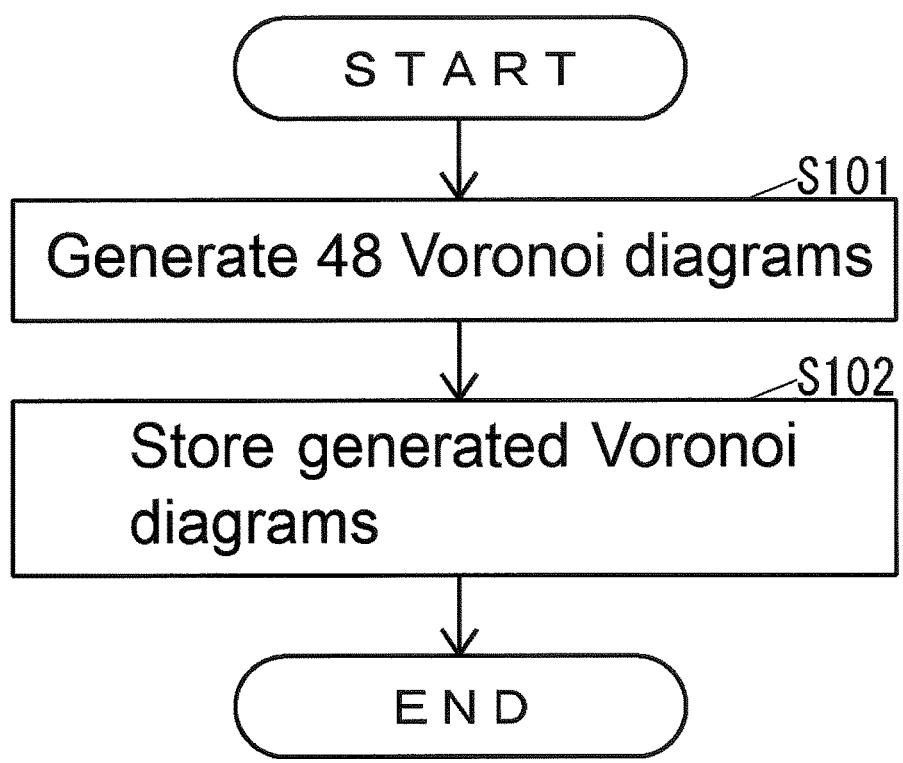
FIG. 5 illustrates operations of the MFP according to the one embodiment when generating the Voronoi diagram.

FIG. 5 illustrates the operations of the MFP 10 when generating a Voronoi diagram.

As illustrated in FIG. 5, the control unit 18 generates a Voronoi diagram based on the Lab value (Lch value) at the grid point of the color conversion table 17b (Step S101). Here, the control unit 18 generates the Voronoi diagram for each range, into 48 of which the whole color gamut is equally divided with hue. The control unit 18 generates the Voronoi diagram for the central hue in each range as the Voronoi diagram of the range. That is, the control unit 18, for each of the grid points inside each range among the grid points of the color conversion table 17b, obtains a point where lightness and saturation are identical with the grid point and the hue is the central hue in the range, and then set the obtained point to be the generatrix of the Voronoi diagram of the range.

Next, the control unit 18 stores the 48 Voronoi diagrams generated at Step S101 into the storage unit 17 as the respective Voronoi diagrams 17c, (Step S102), and then terminates the operations illustrated in FIG. 5.

Next, a description will be given of the operations of the MFP 10 when printing an image.

Figure 6:
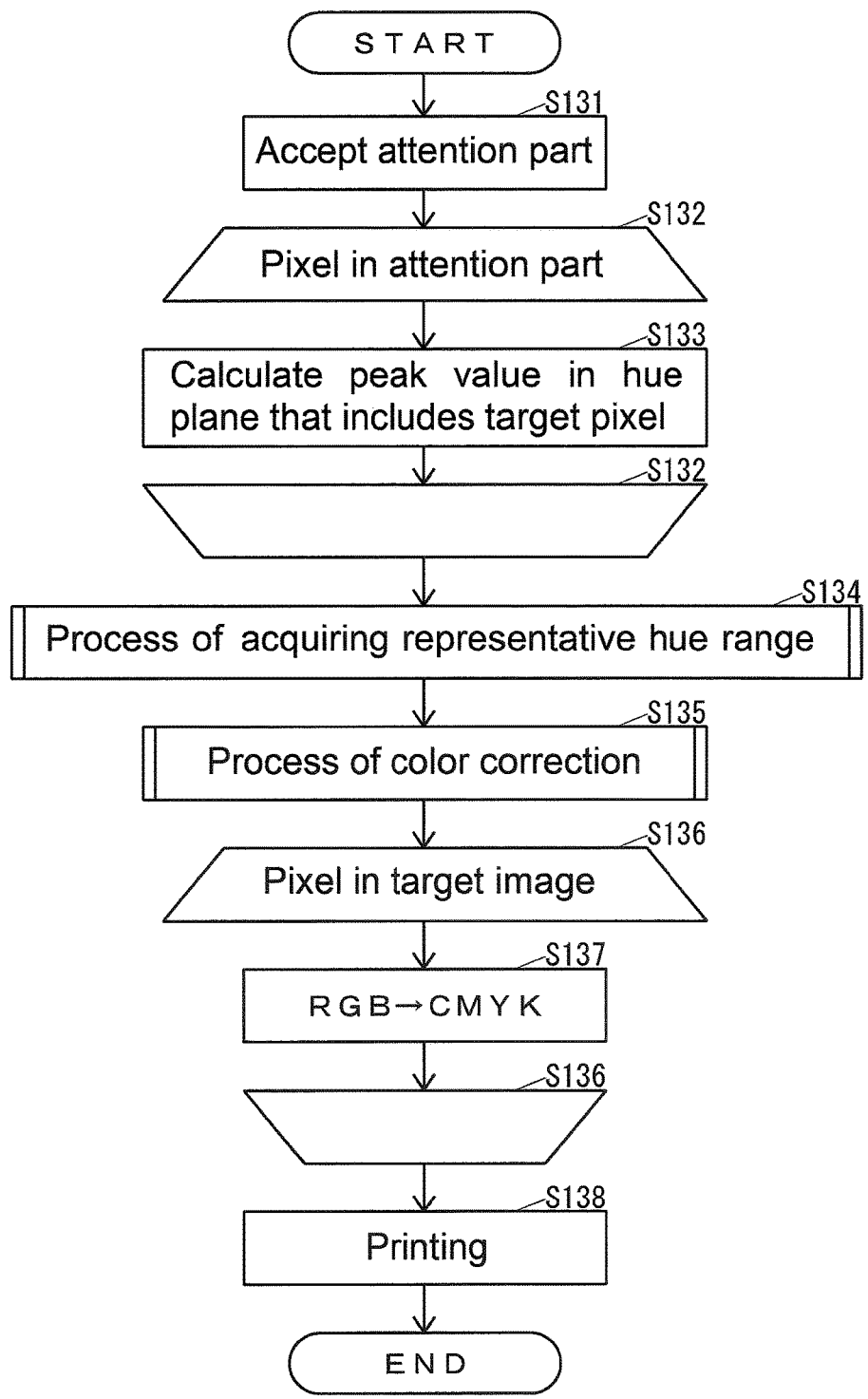
FIG. 6 illustrates the operations of the MFP according to the one embodiment when printing an image.

FIG. 6 illustrates the operations of the MFP 10 when printing an image.

As illustrated in FIG. 6, the specific-part-designation accepting unit 18d of the control unit 18 accepts designation of a specific part in a target image, namely a part on which a user focuses attention (hereinafter referred to as "an attention part" (Step S131).

Here, a user is allowed to enter the designation of the attention part of the target image into the MFP 10 via the operation unit 11 or the communication unit 16 earlier than the operation illustrated in FIG. 6. Consequently, the control unit 18 ensures acceptance of the designation entered via the operation unit 11 or the communication unit 16 earlier than the operation illustrated in FIG. 6, at Step S131. For example, when a user enters the print data of the target image into the MFP 10 from a computer such as a Personal Computer (PC), designation of the attention part of the target image from the user via the control unit of the computer enables the control unit of the computer to include information indicative of the designated attention part in the print data. When the print data, which has been entered via the communication unit 16, includes the information indicative of the attention part, the control unit 18 accepts the attention part indicated by the information included in the print data at Step S131.

The control unit 18, at Step S131, may accept the attention part designated by a user via the operation unit 11 or the communication unit 16 after inquiring the designation of the attention part of the target image from the user via the display 12 or the communication unit 16. For example, when a user enter the print data of the target image into the MFP 10 from a computer such as a PC, the control unit 18 may accept the attention part designated by the user with the operation unit of the computer via the communication unit 16 after inquiring the attention part of the target image from the user with the display of the computer via the communication unit 16.

The attention part may be designated, for example, by a rectangular region in the target image.

After the process at Step S131, the control unit 18 repeats the process at Step S133, which will be described below, with respect to the pixel in the attention part designated at Step S131 one by one (Step S132).

The process at Step S133 is a process that calculates a peak value, namely, an RGB value with maximum saturation with regard to a hue plane that includes the target pixel in an RGB color space.

The representative-hue-range acquiring unit 18b of the control unit 18 executes a representative-hue-range acquiring process that obtains two representative hue ranges among the 48 hue ranges where the whole color gamut is divided after completing the repeated process of Step S133 at Step S132 (Step S134).

Figure 7:
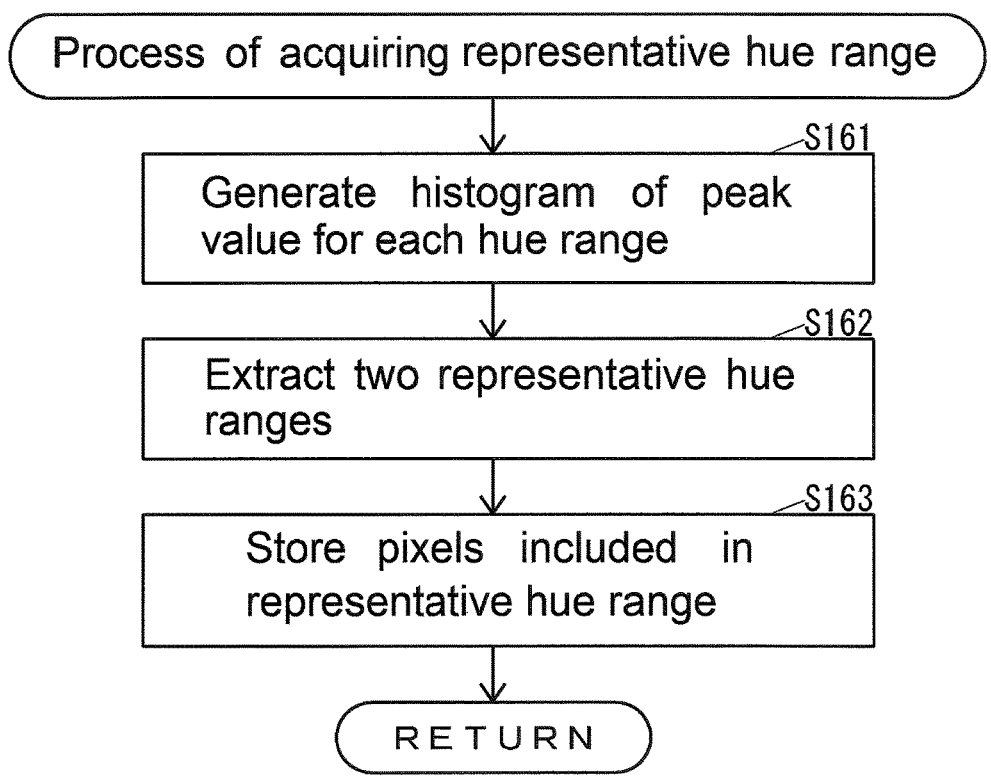
FIG. 7 illustrates a representative-hue-range acquiring process according to the one embodiment.

FIG. 7 illustrates the representative-hue-range acquiring process illustrated in FIG. 6.

As illustrated in FIG. 7, the representative-hue-range acquiring unit 18b generates a histogram with the number of the peak values, which are included in each of the 48 hue ranges, calculated at Step S133 (Step S161). That is, the representative-hue-range acquiring unit 18b obtains a hue-range pixel number as the number of pixels included in the hue range among the pixels of the attention part for each hue range, and then generates a histogram of the hue-range pixel number.

Next, the representative-hue-range acquiring unit 18b extracts two hue ranges, which are peaks in the histogram generated at Step S161, as the representative hue ranges, respectively (Step S162). Specifically, the representative-hue-range acquiring unit 18b extracts the hue range where the peak value is large in number compared with the adjacent hue ranges in the histogram generated at Step S161, and then extracts the top two hue ranges where the peak value is large in number among the extracted hue ranges as the respective representative hue ranges.

Next, among the pixels in the attention part designated at Step S131, the representative-hue-range acquiring unit 18b causes the storage unit 17 to store that which hue range the pixels are included in, with respect to the pixels included in any of the two representative hue ranges extracted at Step S162 (Step S163), and then terminates the representative-hue-range acquiring process illustrated in FIG. 7.

As illustrated in FIG. 6, the control unit 18 executes a color correction process that corrects the RGB value of the pixel in the attention part as necessary after the representative-hue-range acquiring process is terminated at Step S134 (Step S135).

Figure 8:
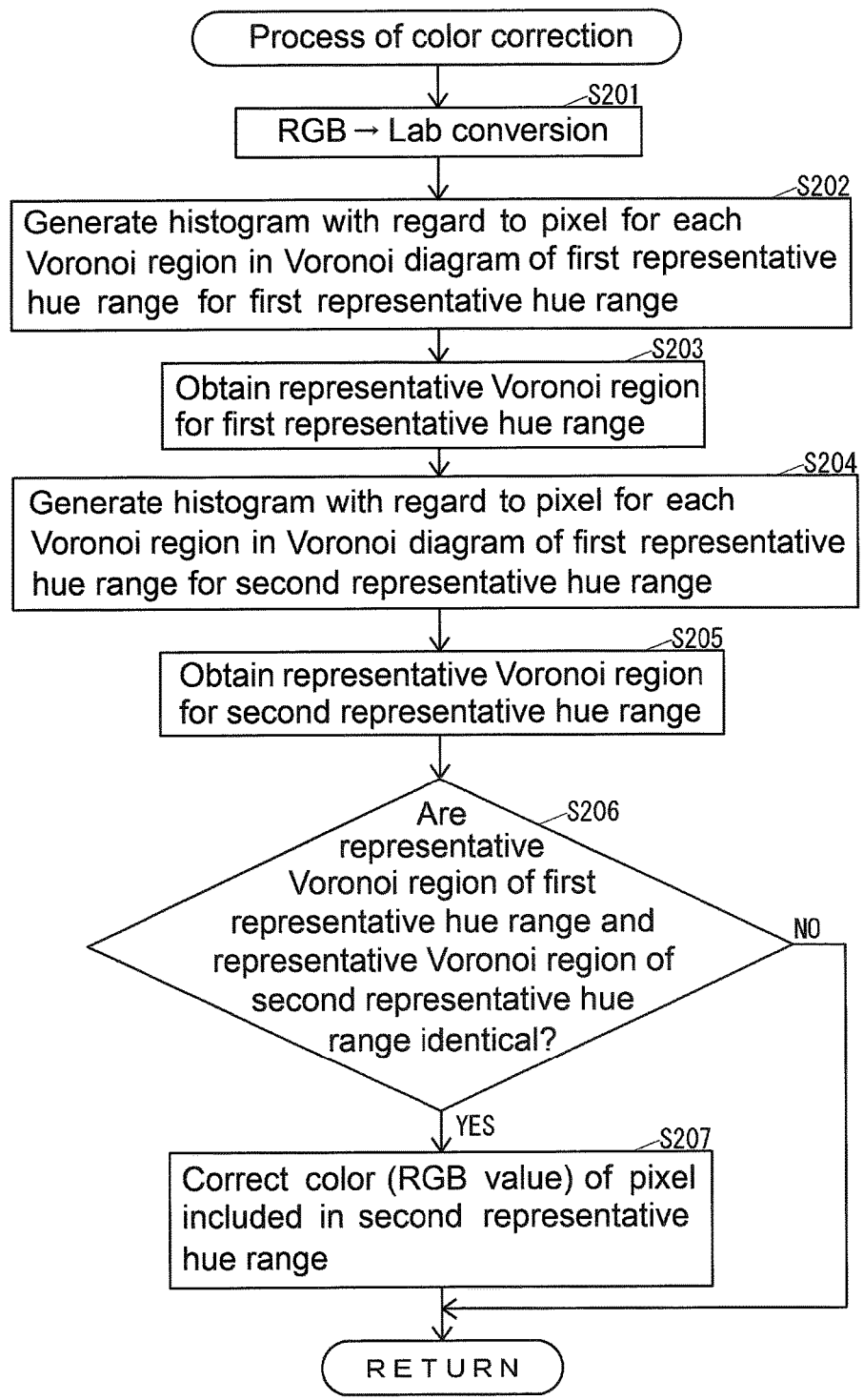
FIG. 8 illustrates a color correction process according to the one embodiment.

FIG. 8 illustrates the color correction process illustrated in FIG. 6.

As illustrated in FIG. 8, the color correction unit 18c of the control unit 18 converts the RGB value of the pixel to the Lab value (Lch value) based on the color conversion table 17b (Step S201). Which hue range includes this pixel has been stored at Step S163. For an RGB value that is not included in the color conversion table 17b, the color correction unit 18c converts the RGB value to a Lab value (Lch value) by an interpolation calculation based on an RGB value included in the color conversion table 17b and the Lab value (Lch value) associated with this RGB value in the color conversion table 17b.

The color correction unit 18c, with respect to one of the two representative hue ranges (hereinafter referred to as "a first representative hue range") extracted at Step S162, generates a histogram with the number corresponding to each of the Voronoi regions in the Voronoi diagram 17c of the first representative hue range with regard to the pixels that have been stored at Step S163 as being included in the first representative hue range (Step S202). That is, the color correction unit 18c obtains a Voronoi-region pixel number as the number of the pixels corresponding to the Voronoi region among the pixels in the attention part for each Voronoi region, and then generates the histogram of the Voronoi-region pixel number. Here, in the Voronoi diagram, the Voronoi region to which the target pixel corresponds is the Voronoi region that includes a point where lightness and saturation are identical with the target pixel and a hue is the hue of the target Voronoi diagram. The first representative hue range is, for example, the hue range with a smaller hue angle, of the two representative hue ranges extracted at Step S162.

Next, the color correction unit 18c obtains the Voronoi region where the Voronoi-region pixel number is the largest in the histogram generated at Step S202, as a representative Voronoi region (Step S203).

Next, the color correction unit 18c, with respect to the other of the two representative hue ranges (hereinafter referred to as "a second representative hue range") extracted at Step S162, generates a histogram with the number corresponding to each of the Voronoi regions in the Voronoi diagram 17c of the first representative hue range with regard to the pixels that have been stored at Step S163 as being included in the second representative hue range (Step S204). That is, the color correction unit 18c obtains the Voronoi-region pixel number as the number of the pixels corresponding to the Voronoi region among the pixels in the attention part for each Voronoi region, and then generates the histogram of the Voronoi-region pixel number. Here, the Voronoi region to which the target pixel inside the second representative hue range corresponds in the Voronoi diagram is the Voronoi region that includes a point (hereinafter referred to as "a movement pixel") where lightness and saturation are identical with the target pixel and a hue is the hue of the target Voronoi diagram.

Next, the color correction unit 18c obtains the Voronoi region where the Voronoi-region pixel number is the largest in the histogram generated at Step S204, as a representative Voronoi region (Step S205).

Next, the color correction unit 18c determines whether or not the representative Voronoi region obtained at Step S203 and the representative Voronoi region obtained at Step S205 are identical (Step S206).

When determining at Step S206 that the representative Voronoi region obtained at Step S203 and the representative Voronoi region obtained at Step S205 are identical, the color correction unit 18c corrects the color of the pixel included in the second representative hue range such that the movement pixel is not included in the representative Voronoi region obtained at Step S205 (Step S207).

The following describes a correction method of color by the color correction unit 18c.

Figure 9:
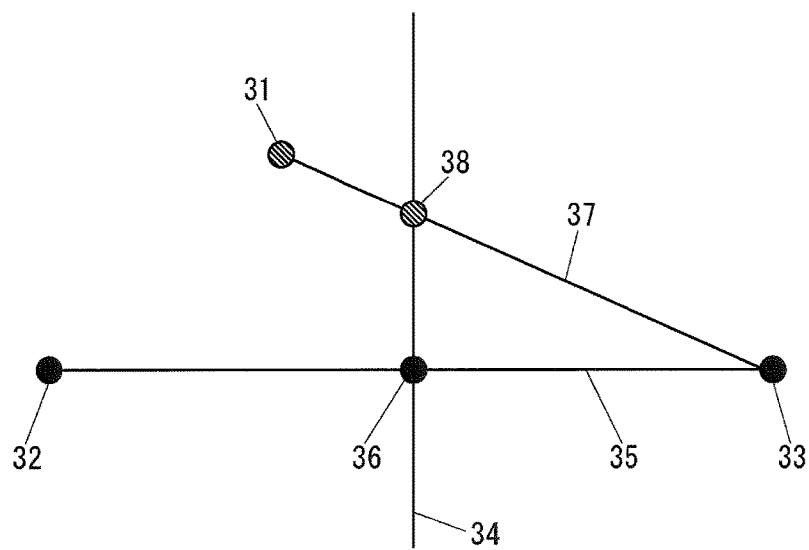
FIG. 9 illustrates one example of a part of the Voronoi diagram illustrated in FIG. 2.

For example, as illustrated in FIG. 9, assume that the movement pixel included in the representative Voronoi region obtained at Step S205 is a movement pixel 31, the Voronoi generatrix in the representative Voronoi region obtained at Step S205 is a Voronoi generatrix 32, the Voronoi generatrix in the Voronoi region adjacent to the representative Voronoi region obtained at Step S205 is a Voronoi generatrix 33, the Voronoi side between the Voronoi generatrix 32 and the Voronoi generatrix 33 is a Voronoi side 34, the line connecting the Voronoi generatrix 32 to the Voronoi generatrix 33 is a line 35, the intersection point of the Voronoi side 34 and the line 35 is an intersection point 36, the line connecting the movement pixel 31 to the Voronoi generatrix 33 is a line 37, and the intersection point of the Voronoi side 34 and the line 37 is an intersection point 38.

Figure 10:
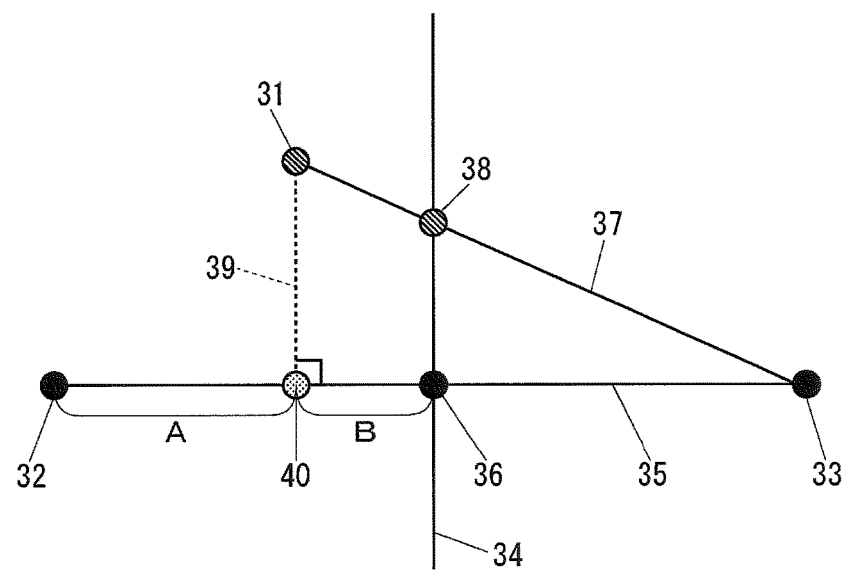
FIG. 10 illustrates the Voronoi diagram illustrated in FIG. 9, in a process of color correction.

First, the color correction unit 18c, as illustrated in FIG. 10, calculates an intersection point 40 between the perpendicular line 39, which is a line from the movement pixel 31 to the line 35, and the line 35. Here, assume that the length of the line segment connecting the Voronoi generatrix 32 to the intersection point 40 is A, and the length of the line segment connecting the intersection point 36 to the intersection point 40 is B. Then the intersection point 40 is a point that internally divides the line segment connecting the Voronoi generatrix 32 to the intersection point 36 at a ratio of A:B. Consequently, the color correction unit 18c calculates an internal division ratio A:B.

Figure 11:
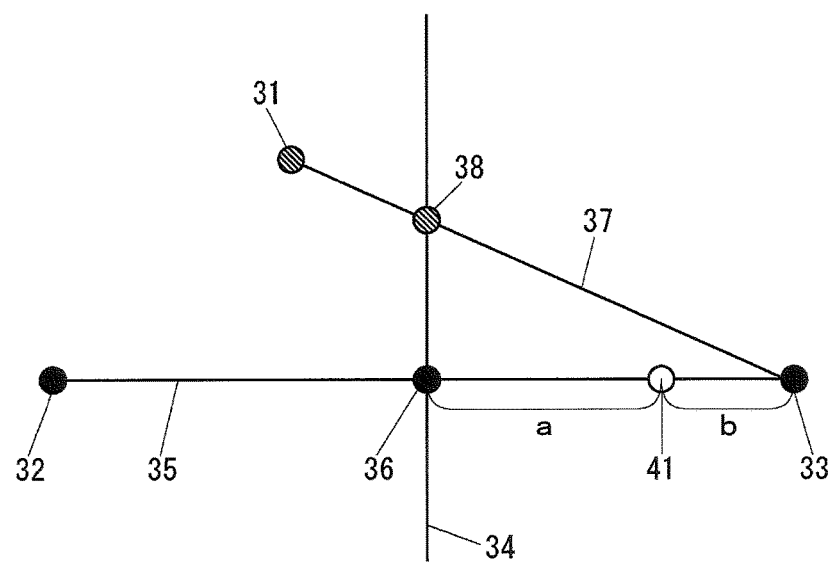
FIG. 11 illustrates the Voronoi diagram in the later process than the process illustrated in FIG. 10, of the process of color correction.

Next, the color correction unit 18c, as illustrated in FIG. 11, calculates a point 41 that internally divides the line segment connecting the Voronoi generatrix 33 to the intersection point 36 at a ratio of a:b, which is identical with the ratio A:B.

Figure 12:
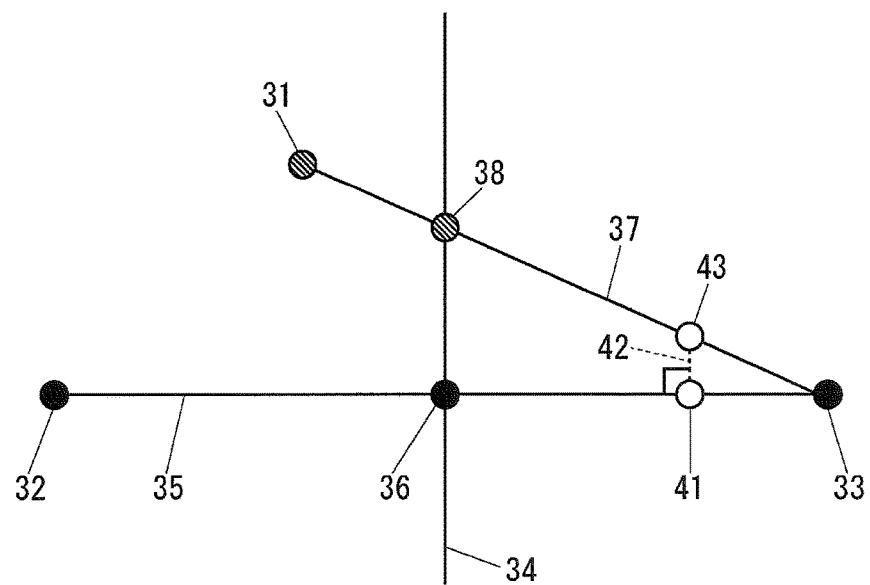
FIG. 12 illustrates the Voronoi diagram in the later process than the process illustrated in FIG. 11, of the process of color correction.

Next, the color correction unit 18c, as illustrated in FIG. 12, calculates a line 42 that is a perpendicular line to the line 35 and passes through the point 41, and then calculates a point 43 that is the intersection point of the calculated line 42 and the line 37. The point 43 is the point (Lch value) after the correction of the movement pixel 31. The color correction unit 18c obtains the Lch value where the hue of the point 43 is returned to the hue of the original pixel included in the second representative hue range, and then converts this Lch value to the RGB value based on the color conversion table 17b, and thus ensures correction of the color of the pixel included in the second representative hue range at Step S207. For an Lch value that is not included in the color conversion table 17b, the color correction unit 18c converts the Lch value to an RGB value by the interpolation calculation based on an Lch value included in the color conversion table 17b and the RGB value associated with this Lch value in the color conversion table 17b.

Of the Voronoi regions adjacent to the representative Voronoi region obtained at Step S205, which Voronoi region the color correction unit 18c moves the movement pixel to depend on design. For example, the color correction unit 18c may move the movement pixel to the Voronoi region with lightness upper by one compared with the representative Voronoi region obtained at Step S205, or may move the movement pixel to the Voronoi region with saturation upper by one compared with the representative Voronoi region obtained at Step S205.

As illustrated in FIG. 8, the color correction unit 18c terminates the color correction process illustrated in FIG. 8 after terminating the process at Step S207.

When determining at Step S206 that the representative Voronoi region obtained at Step S203 and the representative Voronoi region obtained at Step S205 are not identical, the color correction unit 18c terminates the color correction process illustrated in FIG. 8.

As illustrated in FIG. 6, the color conversion unit 18a of the control unit 18 repeats the process at Step S137, which will be described below, with respect to the pixel of the target image one by one after the termination of the color correction process at Step S135 (Step S136).

The process at Step S137 is a process that converts the RGB value of the target pixel among the pixels of the target image to the CMYK value based on the color conversion table 17b. Here, for the pixel with color corrected at Step S207, the color conversion unit 18a uses the RGB value generated at Step S207. For an RGB value that is not included in the color conversion table 17b, the color conversion unit 18a converts the RGB value to a CMYK value by the interpolation calculation based on an RGB value included in the color conversion table 17b and the CMYK value associated with this RGB value in the color conversion table 17b.

Next, the control unit 18 prints the image, where all pixels are converted from the RGB values to the CMYK values by the processes at Step S136 and Step S137, to a recording medium by the printer 14 (Step S138), and then terminates the operations illustrated in FIG. 6.

As described above, because the MFP 10 performs the correction that causes the difference between the specific color in one hue range of the two representative hue ranges and the specific color in the other hue range of the two representative hue ranges to occur, there is no need to change the lightness of the whole low lightness part in the image to improve the visibility of the low lightness part in the image. Consequently, the MFP 10 ensures preventing a significant difference in impression of a whole image on a printed matter from occurring in accordance with whether or not the visibility of the low lightness part in the image is to be improved.

Since the MFP 10 accepts designation of a part for correcting color in an image, namely, an attention part where a user focuses attention, the MFP 10 ensures correcting color for only the appropriate part where a user focuses attention in the image. Consequently, the MFP 10 ensures preventing a significant difference in impression of a whole image on a printed matter from occurring in accordance with whether or not the visibility of the low lightness part in the image is to be improved. The MFP 10 may perform color correction on the whole target image without accepting designation of an attention part where a user focuses attention.

The "image forming apparatus" of the disclosure is an MFP in the embodiment; however, even an image forming apparatus other than an MFP, such as a printer-only machine, may be employed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
a printer;
a storage device that stores a color conversion program and a color conversion table; and
a Central Processing Unit (CPU) as a control unit,
wherein the control unit executes the color conversion program to function as:
a color conversion unit that converts a color of an image by a color conversion table for a print job;
a representative-hue-range acquiring unit that obtains two representative hue ranges relative to a specific part of the image among a plurality of hue ranges where whole color gamut is divided; and
a color correction unit that corrects the color of the image whose color is converted by the color conversion unit,
wherein the control unit:

generates a Voronoi diagram based on a Lab value at a grid point of the color conversion table, for each range, into 48 of which the whole color gamut is equally divided with hue;

stores 48 Voronoi diagrams into the storage device;

accepts the specific part of the image;

calculates a peak value that is an RGB value with maximum saturation with regard to a hue plane that includes a target pixel in an RGB color space;

executes a representative-hue-range acquiring process;

executes a color correction process that corrects the RGB value of the pixel in the specific part after the representative-hue-range acquiring process is terminated; and prints the image, where all pixels are converted from RGB values to CMYK values, to a recording medium by the printer, wherein the representative-hue-range acquiring process performed by the representative-hue-range acquiring unit in the control unit comprises:

obtaining a hue-range pixel number as the number of pixels included in the hue range among the pixels in the specific part for each hue range, generating a histogram of the hue-range pixel number, extracting the hue range where a peak value is large in number compared with adjacent hue ranges in the histogram, obtaining the top two hue ranges where the peak value is large in number among the extracted hue ranges as each of the representative hue ranges including a first representative hue range and a second representative hue range, and causing the storage device to store that which the representative hue range the pixels in the specific part are included, and wherein the color correction process performed by the color correction unit in the control unit comprises:

converting RGB value of the pixels included in each of the representative hue ranges to the Lab value based on the color conversion table, obtaining a Voronoi-region pixel number as the number of the pixels corresponding to the Voronoi region among the pixels in the specific part for the Voronoi region of the first representative hue range, generating a histogram of the Voronoi-region pixel number of the first representative hue range, obtaining the Voronoi region where the Voronoi-region pixel number is the largest in the histogram as a first representative Voronoi region;

obtaining a Voronoi-region pixel number as the number of the pixels corresponding to the Voronoi region among the pixels in the specific part for the Voronoi region of the second representative hue range;

generating a histogram of the Voronoi-region pixel number of the second representative hue range;

obtaining the Voronoi region where the Voronoi-region pixel number is the largest in the histogram as a second representative Voronoi region;

determining whether or not the first representative Voronoi region and the second representative Voronoi region are identical; and correcting, when determining that the first representative Voronoi region and the second representative Voronoi region are identical, the color of the pixel included in the second representative hue range such that a movement pixel is not included in the second representative Voronoi region, the movement pixel being a point where lightness and saturation are identical with the target pixel and a hue is the hue of the target Voronoi diagram.

2. The image forming apparatus according to claim 1, further comprising
a specific-part-designation accepting unit that accepts designation of the specific part.

3. A non-transitory computer-readable recording medium storing a color conversion program to control an image forming apparatus that includes a printer, a storage device, and a Central Processing Unit (CPU), the color conversion program causing the CPU to function as a control unit, and the control unit comprising:

a color conversion unit that converts a color of an image by a color conversion table for a print job;

a representative-hue-range acquiring unit that obtains two representative hue ranges relative to a specific part of the image among a plurality of hue ranges where whole color gamut is divided; and a color correction unit that corrects the color of the image whose color is converted by the color conversion unit, wherein the control unit:

generates a Voronoi diagram based on a Lab value at a grid point of the color conversion table, for each range, into 48 of which the whole color gamut is equally divided with hue;

stores 48 Voronoi diagrams into the storage device;

accepts the specific part of the image;

calculates a peak value that is an RGB value with maximum saturation with regard to a hue plane that includes a target pixel in an RGB color space;

executes a representative-hue-range acquiring process;

executes a color correction process that corrects the RGB value of the pixel in the specific part after the representative-hue-range acquiring process is terminated; and prints the image, where all pixels are converted from RGB values to CMYK values, to a recording medium by the printer, wherein the representative-hue-range acquiring process performed by the representative-hue-range acquiring unit in the control unit comprises:

obtaining a hue-range pixel number as the number of pixels included in the hue range among the pixels in the specific part for each hue range, generating a histogram of the hue-range pixel number, extracting the hue range where a peak value is large in number compared with adjacent hue ranges in the histogram, obtaining the top two hue ranges where the peak value is large in number among the extracted hue ranges as each of the representative hue ranges including a first representative hue range and a second representative hue range, and causing the storage device to store that which the representative hue range the pixels in the specific part are included, and wherein the color correction process performed by the color correction unit in the control unit comprises:

converting RGB value of the pixels included in each of the representative hue ranges to the Lab value based on the color conversion table, obtaining a Voronoi-region pixel number as the number of the pixels corresponding to the Voronoi region among the pixels in the specific part for the Voronoi region of the first representative hue range, generating a histogram of the Voronoi-region pixel number of the first representative hue range, obtaining the Voronoi region where the Voronoi-region pixel number is the largest in the histogram as a first representative Voronoi region;

obtaining a Voronoi-region pixel number as the number of the pixels corresponding to the Voronoi region among the pixels in the specific part for the Voronoi region of the second representative hue range;

generating a histogram of the Voronoi-region pixel number of the second representative hue range;

obtaining the Voronoi region where the Voronoi-region pixel number is the largest in the histogram as a second representative Voronoi region;

determining whether or not the first representative Voronoi region and the second representative Voronoi region are identical; and correcting, when determining that the first representative Voronoi region and the second representative Voronoi region are identical, the color of the pixel included in the second representative hue range such that a movement pixel is not included in the second representative Voronoi region, the movement pixel being a point where lightness and saturation are identical with the target pixel and a hue is the hue of the target Voronoi diagram.

4. A color conversion method by an image forming apparatus that includes a printer, a storage device, and a Central Processing Unit (CPU) as a control unit, the method comprising:

via the control unit, generating a Voronoi diagram based on a Lab value at a grid point of a color conversion table in the storage device, for each range, into 48 of which the whole color gamut is equally divided with hue;

storing 48 Voronoi diagrams into the storage device;

accepting the specific part of an image;

calculating a peak value that is an RGB value with maximum saturation with regard to a hue plane that includes a target pixel in an RGB color space:

executing a representative-hue-range acquiring process;

executing a color correction process that corrects the RGB value of the pixel in the specific part after the representative-hue-range acquiring process is terminated; and printing the image, where all pixels are converted from RGB values to CMYK values, to a recording medium by the printer, wherein the representative-hue-range process comprising:

obtaining a hue-range pixel number as the number of pixels included in the hue range among the pixels in the specific part for each hue range, generating a histogram of the hue-range pixel number, extracting the hue range where a peak value is large in number compared with adjacent hue ranges in the histogram, obtaining the top two hue ranges where the peak value is large in number among the extracted hue ranges as each of the representative hue ranges including a first representative hue range and a second representative hue range, and causing the storage device to store that which the representative hue range the pixels in the specific part are included, and wherein the color correction process comprising:

converting RGB value of the pixels included in each of the representative hue ranges to the Lab value based on the color conversion table, obtaining a Voronoi-region pixel number as the number of the pixels corresponding to the Voronoi region among the pixels in the specific part for the Voronoi region of the first representative hue range, generating a histogram of the Voronoi-region pixel number of the first representative hue range, obtaining the Voronoi region where the Voronoi-region pixel number is the largest in the histogram as a first representative Voronoi region;

obtaining a Voronoi-region pixel number as the number of the pixels corresponding to the Voronoi region among the pixels in the specific part for the Voronoi region of the second representative hue range;

generating a histogram of the Voronoi-region pixel number of the second representative hue range;

obtaining the Voronoi region where the Voronoi-region pixel number is the largest in the histogram as a second representative Voronoi region;

determining whether or not the first representative Voronoi region and the second representative Voronoi region are identical; and correcting, when determining that the first representative Voronoi region and the second representative Voronoi region are identical, the color of the pixel included in the second representative hue range such that a movement pixel is not included in the second representative Voronoi region, the movement pixel being a point where lightness and saturation are identical with the target pixel and a hue is the hue of the target Voronoi diagram.

* * * * *